United States Patent
Koehn (10) Patent No.: US 7,711,545 B2
(45) Date of Patent: May 4, 2010

(54) EMPIRICAL METHODS FOR SPLITTING COMPOUND WORDS WITH APPLICATION TO MACHINE TRANSLATION

(75) Inventor: Philipp Koehn, Cambridge, MA (US)

(73) Assignee: Language Weaver, Inc., Los Angeles, CA (US)

( * ) Notice: Subject to any disclaimer, the term of this patent is extended or adjusted under 35 U.S.C. 154(b) by 1701 days.

(21) Appl. No.: 10/884,174

(22) Filed: Jul. 2, 2004

(65) Prior Publication Data

US 2005/0033565 A1 Feb. 10, 2005

Related U.S. Application Data

(60) Provisional application No. 60/484,812, filed on Jul. 2, 2003.

(51) Int. Cl.
*G06F 17/28* (2006.01)
(52) U.S. Cl. .................. 704/5; 704/2; 704/10; 704/4
(58) Field of Classification Search .................. 704/5, 704/2, 4, 10
See application file for complete search history.

(56) References Cited

U.S. PATENT DOCUMENTS

| | | | |
|---|---|---|---|
| 4,502,128 A | 2/1985 | Okajima et al. |
| 4,599,691 A | 7/1986 | Sakaki et al. |
| 4,787,038 A | 11/1988 | Doi et al. |
| 4,814,987 A | 3/1989 | Miyao et al. |
| 4,942,526 A | 7/1990 | Okajima et al. |
| 5,146,405 A | 9/1992 | Church |
| 5,181,163 A | 1/1993 | Nakajima et al. |
| 5,212,730 A | 5/1993 | Wheatley et al. |
| 5,267,156 A | 11/1993 | Nomiyama |
| 5,311,429 A | 5/1994 | Tominaga |
| 5,432,948 A | 7/1995 | Davis et al. |
| 5,477,451 A | 12/1995 | Brown et al. |
| 5,510,981 A | 4/1996 | Berger et al. |
| 5,644,774 A | 7/1997 | Fukumochi et al. |
| 5,696,980 A | 12/1997 | Brew |
| 5,724,593 A | 3/1998 | Hargrave, III et al. |
| 5,754,972 A * | 5/1998 | Baker et al. ................. 704/200 |
| 5,761,631 A | 6/1998 | Nasukawa |
| 5,781,884 A | 7/1998 | Pereira et al. |
| 5,805,832 A | 9/1998 | Brown et al. |
| 5,848,385 A | 12/1998 | Poznanski et al. |
| 5,867,811 A | 2/1999 | O'Donoghue |

(Continued)

FOREIGN PATENT DOCUMENTS

EP 0469884 A2 2/1992

(Continued)

OTHER PUBLICATIONS

Abney, Stephen, "Parsing by Chunks," 1991, Principle-Based Parsing: Computation and Psycholinguistics, vol. 44, pp. 257-279.

(Continued)

*Primary Examiner*—Vijay B Chawan
(74) *Attorney, Agent, or Firm*—Carr & Ferrell LLP (57) ABSTRACT

A statistical machine translation (MT) system may include a compound splitting module to split compounded words for more accurate translation. The compound splitting module select a best split for translation by the MT system.

20 Claims, 5 Drawing Sheets

U.S. PATENT DOCUMENTS

| | | | |
|---|---|---|---|
| 5,870,706 | A | 2/1999 | Alshawi |
| 5,903,858 | A | 5/1999 | Saraki |
| 5,987,404 | A | 11/1999 | Della Pietra et al. |
| 5,991,710 | A | 11/1999 | Papineni et al. |
| 6,031,984 | A | 2/2000 | Walser |
| 6,032,111 | A | 2/2000 | Mohri |
| 6,092,034 | A | 7/2000 | McCarley et al. |
| 6,119,077 | A | 9/2000 | Shinozaki |
| 6,131,082 | A | 10/2000 | Hargrave, III et al. |
| 6,182,014 | B1 | 1/2001 | Kenyon et al. |
| 6,182,027 | B1* | 1/2001 | Nasukawa et al. ............. 704/2 |
| 6,205,456 | B1 | 3/2001 | Nakao |
| 6,223,150 | B1 | 4/2001 | Duan et al. |
| 6,236,958 | B1 | 5/2001 | Lange et al. |
| 6,278,967 | B1 | 8/2001 | Akers et al. |
| 6,285,978 | B1 | 9/2001 | Bernth et al. |
| 6,289,302 | B1 | 9/2001 | Kuo |
| 6,304,841 | B1 | 10/2001 | Berger et al. |
| 6,311,152 | B1 | 10/2001 | Bai et al. |
| 6,360,196 | B1 | 3/2002 | Poznanski et al. |
| 6,389,387 | B1 | 5/2002 | Poznanski et al. |
| 6,393,388 | B1 | 5/2002 | Franz et al. |
| 6,393,389 | B1 | 5/2002 | Chanod et al. |
| 6,415,250 | B1 | 7/2002 | van den Akker |
| 6,460,015 | B1 | 10/2002 | Hetherington et al. |
| 6,502,064 | B1 | 12/2002 | Miyahira et al. |
| 6,782,356 | B1 | 8/2004 | Lopke |
| 6,810,374 | B2 | 10/2004 | Kang |
| 6,904,402 | B1 | 6/2005 | Wang et al. |
| 7,107,215 | B2 | 9/2006 | Ghali |
| 7,113,903 | B1 | 9/2006 | Riccardi et al. |
| 2001/0009009 | A1* | 7/2001 | Iizuka ........................ 707/539 |
| 2002/0188438 | A1 | 12/2002 | Knight et al. |
| 2002/0198701 | A1 | 12/2002 | Moore |
| 2003/0144832 | A1* | 7/2003 | Harris ......................... 704/10 |
| 2004/0030551 | A1 | 2/2004 | Marcu et al. |

FOREIGN PATENT DOCUMENTS

| | | | |
|---|---|---|---|
| EP | 0715265 | A2 | 6/1996 |
| EP | 0933712 | A2 | 8/1999 |
| JP | 07244666 | | 1/1995 |
| JP | 10011447 | | 1/1998 |
| JP | 11272672 | | 10/1999 |

OTHER PUBLICATIONS

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc, of 18th conf. on Computational Linguistics, vol. 1, pp. 42-48.

Bangalore, S. and Rambow, O., "Evaluation Metrics for Generation," 2000, Proc. of the 1st International Natural Language Generation Conf., vol. 14, p. 1-8.

Bangalore, S. and Rambow, O., "Using TAGs, a Tree Model, and a Language Model for Generation," May 2000, Workshop TAG+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th Int'l Conf. on Theoretical and Methodological Issue in MT, pp. 287-294.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc. of the Conference on ContentBased Multimedia Information Access (RIAO).

Elhadad, M. and Robin, J., "An Overview of Surge: a Reusable Comprehensive Syntactic Realization Component," 1996, Technical Report Mar. 1996, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel.

Elhadad. M. and Robin, J., "SURGE: a Comprehensive Plug-in Syntactic Realization Component for Text Generation", 1999 (available at http://www.cs.bgu.ac.il/~elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Gale, W.,and Church, K., "A Program for Aligning Sentences in Bilingual Corpora," 1991, 29th Annual Meeting of the ACL, pp. 177-183.

Germann, Ulrich, "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation", 2001, Proc. of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource for Example-Based Machine Translation Tasks", 1999, Translating and the Computer 21, Proc. of the 21st International Conf. on Translating and the Computer, London, UK, 12 pp.

Hatzivassiloglou, V. et al., "Unification-Based Glossing", 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", . Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 1999, Proc. of the ACL Workshop on Unsupervised Learning in Natural Language Processing.

Knight, K. and Al-Onaizan, Y., "A Primer on Finite-State Software for Natural Language Processing", 1999 (available at http://www.isi.edu/licensed-sw/carmel).

Knight, Kevin, "A Statistical MT Tutorial Workbook," 1999, JHU Summer Workshop (available at http://www.isi.edu/natural-language/mt/wkbk.rtf).

Knight, Kevin, "Automating Knowledge Acquisition for Machine Translation," 1997, AI Magazine 18(4).

Knight, K. and Chander, I., "Automated Postediting of Documents,"1994, Proc. of the 12th Conference on Artificial Intelligence, pp. 779-784.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1; No. 4.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight et al., "Translation with Finite-State Devices," 1998, Proc. of the 3rd AMTA Conference, pp. 421-437.

Knight, K. and Hatzivassiloglou, V., "Two-Level, Many-Paths Generation," 1995, Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary,.Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-177.

Langkilde, I. and Knight, K., "The Practical Value of N-Grams in Generation," 1998, Proc. of the 9th International Natural Language Generation Workshop, p. 248-255.

Langkilde, I. and Knight, K., "Generation that Exploits Corpus-Based Statistical Knowledge," 1998, Proc. of the COLING-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACL/EACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al., "Generating Phonetic Cognates to Handle Named Entitles in English-Chinese Cross-Language Spoken Document Retrieval," 2001, IEEE Workshop on Automatic Speech Recognition and Understanding, pp. 311-314.

Miike et al., "A full-text retrieval system with a dynamic abstract generation function," 1994, Proceedings of SI-GIR '94, pp. 152-161.

Mikheev et al., "Named Entity Recognition without Gazeteers," 1999, Proc. of European Chapter of the ACL, Bergen, Norway, pp. 1-8.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Niessen, S. and Ney, H, "Toward hierarchical models for statistical machine translation of inflected languages," 2001, Data-Driven Machine Translation Workshop, Toulouse, France, pp. 47-54.

Och, F. and Ney, H, "Improved Statistical Alignment Models," 2000, 38th Annual Meeting of the ACL, Hong Kong, pp. 440-447.

Och et al., "Improved Alignment Models for Statistical Machine Translation," 1999, Proc. of the Joint Conf. of Empirical Methods in Natural Language Processing and Very Large Corpora, pp. 20-28.

Papineni et al., "Bleu: a Method for Automatic Evaluation of Machine Translation," 2001, IBM Research Report, RC22176(WO102-022).

Pla et al., "Tagging and Chunking with Bigrams," 2000, Proc. of the 18th Conference on Computational Linguistics, vol. 2, pp. 614-620.

Rapp, Reinhard, Automatic Identification of Word Translations from Unrelated English and German Corpora, 1999, 37th Annual Meeting of the ACL, pp. 519-526.

Rapp, Reinhard, "Identifying Word Translations in Non-Parallel Texts," 1995, 33rd Annual Meeting of the ACL, pp. 320-322.

Resnik, P. and Yarowsky, D., "A Perspective on Word Sense Disambiguation Methods and Their Evaluation," 1997, Proceedings of SIGLEX '97, Washington, DC, pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

Selman et al., "A New Method for Solving Hard Satisfiability Problems," 1992, Proc. of the 10th National Conference on Artificial Intelligence, San Jose, CA, pp. 440-446.

Schutze, Hinrich, "Automatic Word Sense Discrimination," 1998, Computational Linguistics, Special Issue on Word Sense Disambiguation, vol. 24, Issue 1, pp. 97-123.

Sobashima et al., "A Bidirectional Transfer-Driven Machine Translation System for Spoken Dialogues," 1994, Proc. of 15th Conference on Computational Linguistics, vol. 1, pp. 64-68.

Shapiro, Stuart (ed.), "Encyclopedia of Artificial Intelligence, 2nd edition", vol. 2, 1992, John Wiley & Sons Inc; "Unification" article, K. Knight, pp. 1630-1637.

Soricut et al., "Using a large monolingual corpus to improve translation accuracy," 2002, Lecture Notes In Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language.

Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on Fifth Generation Computer Systems, vol. 2, pp. 1133-1140.

Taylor et al., "The Penn Treebank: An Overview," in A. Abeill (ed.), Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammar Interference and Statistical Machine Translation," 1998, Ph.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Kelhanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekal, "Stochastic Inversion Transduction Grammars and Bilingual Parsing of Parallel Corpora," 1997, Computational Linguistics, vol. 23, Issue 3, pp. 377-403.

Wu, Dekal, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," 2001, Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Tokyo, Japan.

Yarowsky, David, "Unsupervised Word Sense Disambiguation Rivaling Supervised Methods," 1995, 33rd Annual Meeting of the ACL, pp. 189-196.

Callan et al., "TREC and TIPSTER Experiments with Inquery," 1994, Information Processing and Management, vol. 31, Issue 3, pp. 327-343.

Cohen, Yossi, "Interpreter for FUF," (available at ftp://ftp.cs.bgu.ac.il/pub/people/elhadad/fuf-life.lf).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Saba, G., "IDL-Expressions: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents].

Ueffing et al., "Generation of Word Graphs in Statistical Machine Translation," 2002, Proc. of Empirical Methods in Natural Language Processing (EMNLP), pp. 156-163.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4, pp. 720-727.

* cited by examiner

EMPIRICAL METHODS FOR SPLITTING COMPOUND WORDS WITH APPLICATION TO MACHINE TRANSLATION

CROSS-REFERENCE TO RELATED APPLICATIONS

This application claims priority to U.S. Provisional Application Ser. No. 60/484,812, filed on Jul. 2, 2003, the disclosure of which is incorporated here by reference in its entirety.

ORIGIN OF INVENTION

The research and development described in this application were supported by DARPA under grant number N66001-00-1-8914. The U.S. Government may have certain rights in the claimed inventions.

BACKGROUND

Machine translation (MT) is the automatic translation from a first language (a "source" language) into another language (a "target" language). Systems that perform an MT process are said to "decode" the source language into the target language.

A statistical MT system that translates foreign language sentences, e.g., French, into English may include the following components: a language model that assigns a probability P(e) to any English string; a translation model that assigns a probability P(f|e) to any pair of English and French strings; and a decoder. The decoder may take a previously unseen sentence f and try to find the e that maximizes P(e|f), or equivalently maximizes P(e)*P(f|e).

Compounded words may present a challenge for MT systems. Compounding of words is common in a number of languages (e.g., German, Dutch, Finnish, and Greek). An example of a compounded word is the German word "Aktionsplan", which was created by joining the words "Aktion" and "Plan". Words may be joined freely in such languages, which may greatly increase the vocabulary size of such languages.

SUMMARY

A statistical machine translation (MT) system may include a compound splitting module to split compounded words ("compounds") for more accurate translation. The compound splitting module select a best split for translation by the MT system.

The compound splitting module may identify split option(s) for a compound, rank the compounds, and then pick a best translation from the compound and split option(s). The compound splitting module may rank using different metrics, e.g., frequency of a split's parts in a corpus or translations of the compound in a translation lexicon. The compound splitting module may exclude split options based on parts-of-speech they contain, e.g., prepositions and determiners.

DETAILED DESCRIPTION

Figure 1:
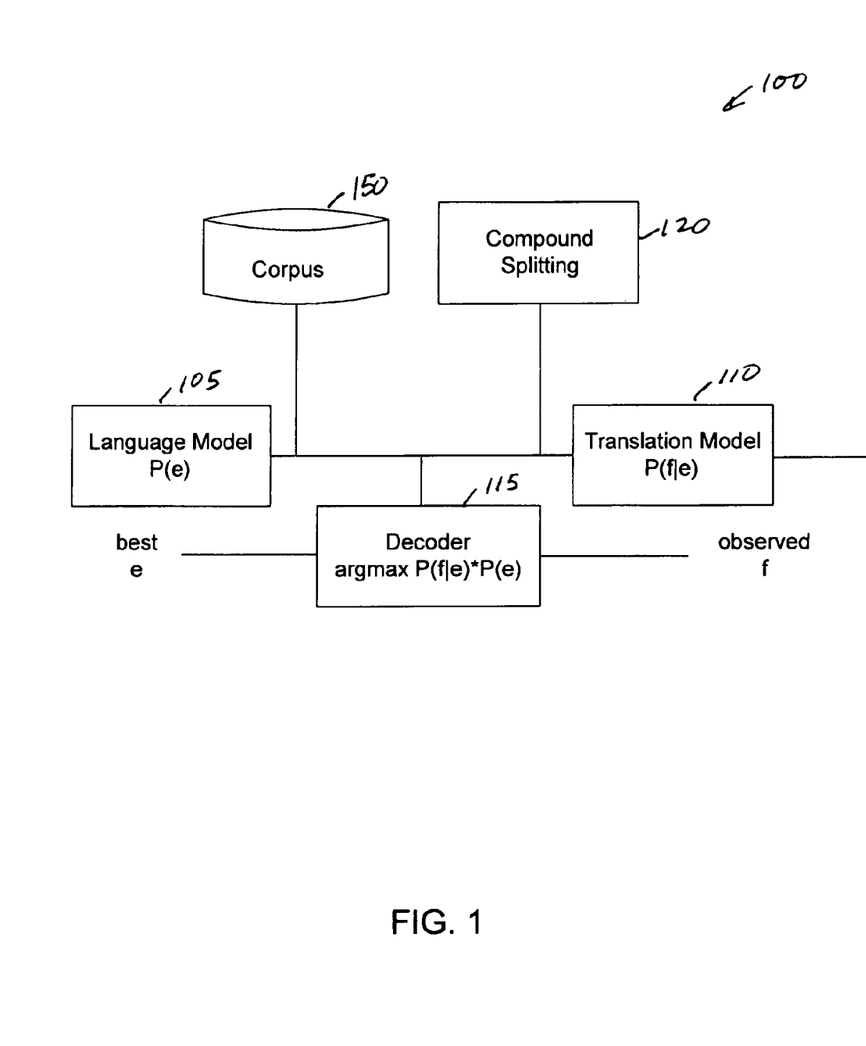
FIG. 1 is a block diagram of a statistical machine translation (MT) system including a compound splitting module according to an embodiment.

FIG. 1 illustrates a statistical machine translation (MT) system 100 according to an embodiment. The MT system 100 may be used to translate from a source language (e.g., French) to a target language (e.g., English). The MT system 100 may include a language model 105, a translation model 110, and a decoder 115.

The MT system 100 may be based on a source-channel model. The language model 105 (or "source") may assign a probability P(e) to any given English sentence e. The language model 105 may be an n-gram model trained by a large monolingual corpus to determine the probability of a word sequence. The translation model 110 may be used to determine the probability of correctness for a translation, e.g., the probability P(f|e) of a French string f given an English string e. The parameter values for computing P(f|e) may be learned from a parallel corpus including bilingual sentence pairs. The translation model 110 may be, for example, an IBM translation Model 4, described in U.S. Pat. No. 5,477,451. The decoder may be used to identify the best translation by maximizing the product of P(e)*P(f|e)

Compounding of words is common in a number of languages (e.g., German, Dutch, Finnish, and Greek). The compounded words (or "compounds") may greatly increase the vocabulary size of such languages, which may present a challenge for MT systems.

Figure 2:
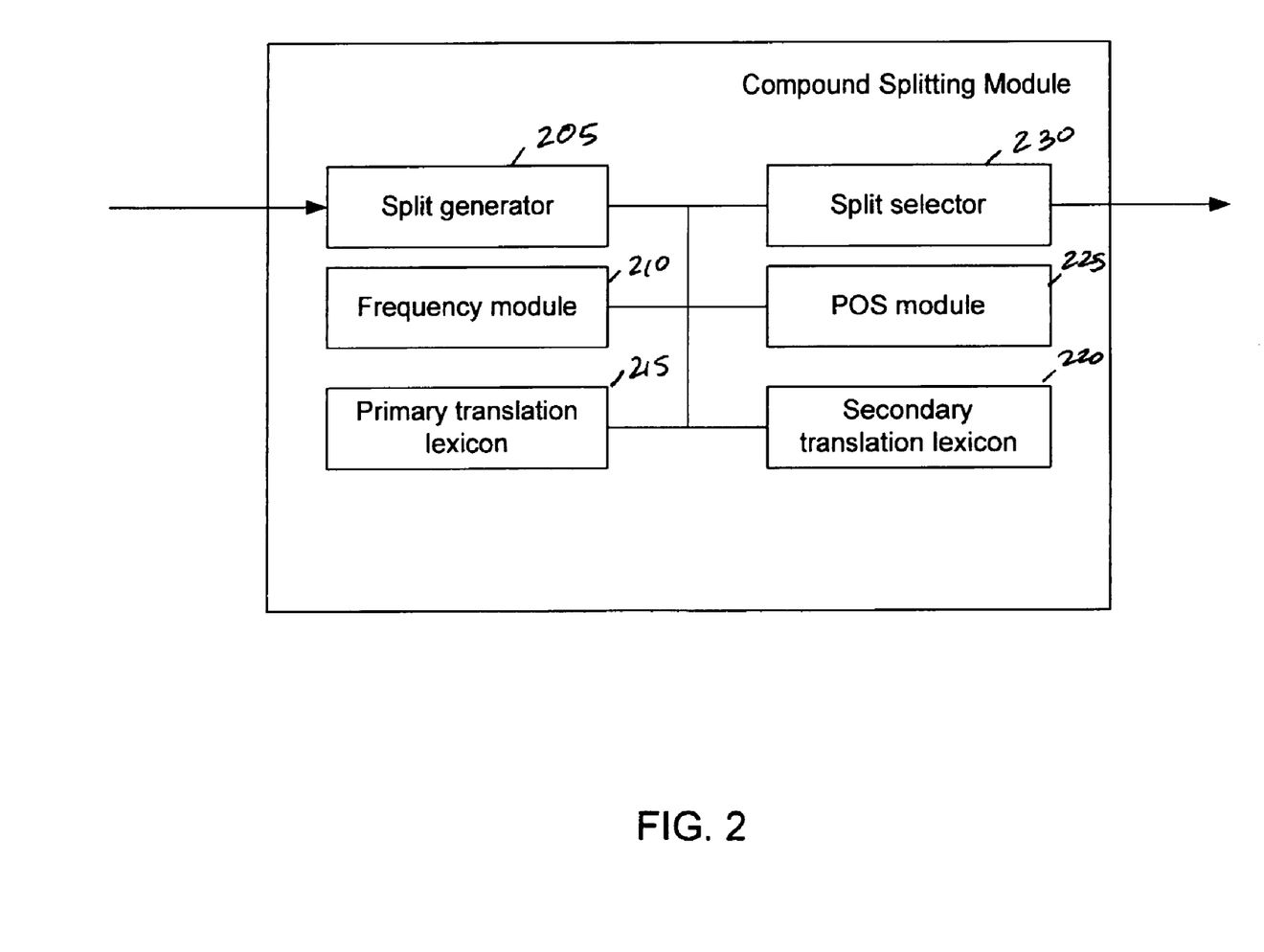
FIG. 2 is a block diagram of a compound splitting module.

In an embodiment, the MT system 100 may include a compound splitting module 120 to determine if and how a compounded word should be split in a translation operation. FIG. 2 shows various components of the compound splitting module 120. These components may include a split generator 205, a frequency module 210, a primary translation lexicon 215, a secondary translation lexicon 220, a part-of-speech (POS) module 225, and a split selector 230.

Figure 3:
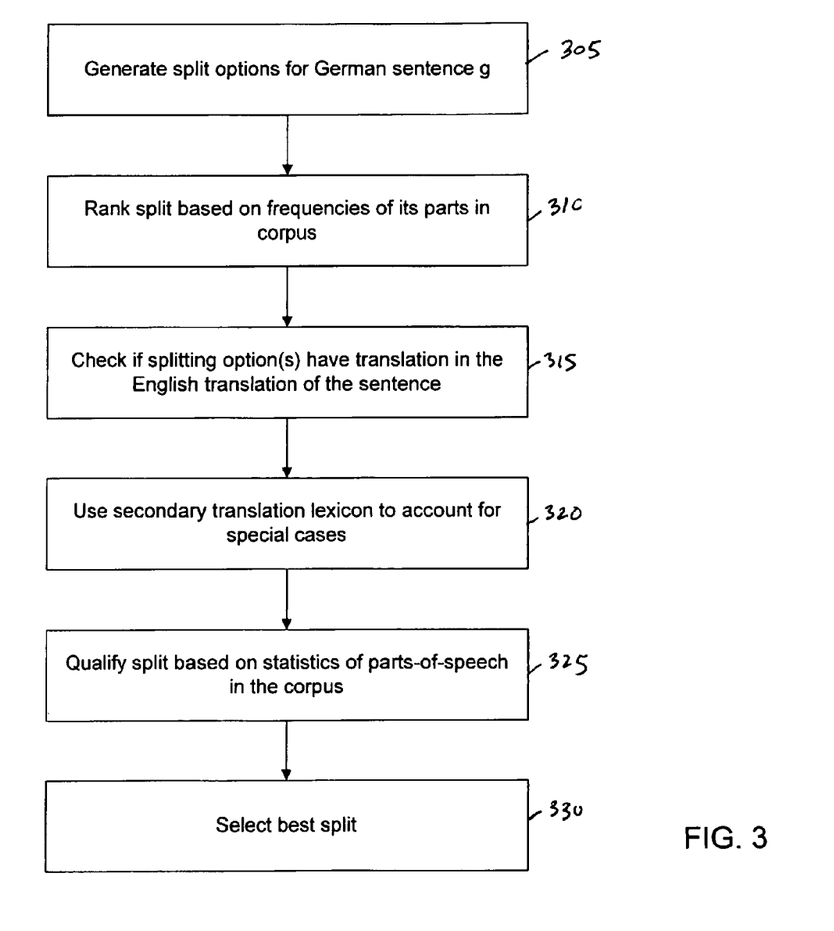
FIG. 3 is a flowchart describing a compound splitting operation.

FIG. 3 is a flowchart describing operations that may be performed by the compound splitting module in an MT system for translating German sentences into English. The split generator 205 may split a German word into possible split options (or "splits") (block 305), e.g., into parts that have individual translations into English words. The frequency module 210 may select split(s) based on the frequencies of the splits' parts in the corpus (block 310). The primary translation 215 lexicon may check if the splits have corresponding translations in the English translation of the sentence (block 315), and the secondary translation lexicon 320 may be used to account for special cases (block 320). The POS module 325 may qualify the splits based on statistics of parts-of-speech in the translation lexicon (block 325). The split selector 230 may then select the best split (block 330).

The split generator 205 may use known words, e.g., words existing in a training corpus 150 (FIG. 1) to identify possible splittings of a compound. In an experiment, the training corpus used was Europarl, which is derived from the European parliament proceedings and consists of 20 million words of German (available at http://www.isi.edu/publications/europarl/). To speed up word matching, the known words may be stored in a hash table based on the first three letters. The known words in the hash table may be limited to words having at least three letters.

Figure 4:
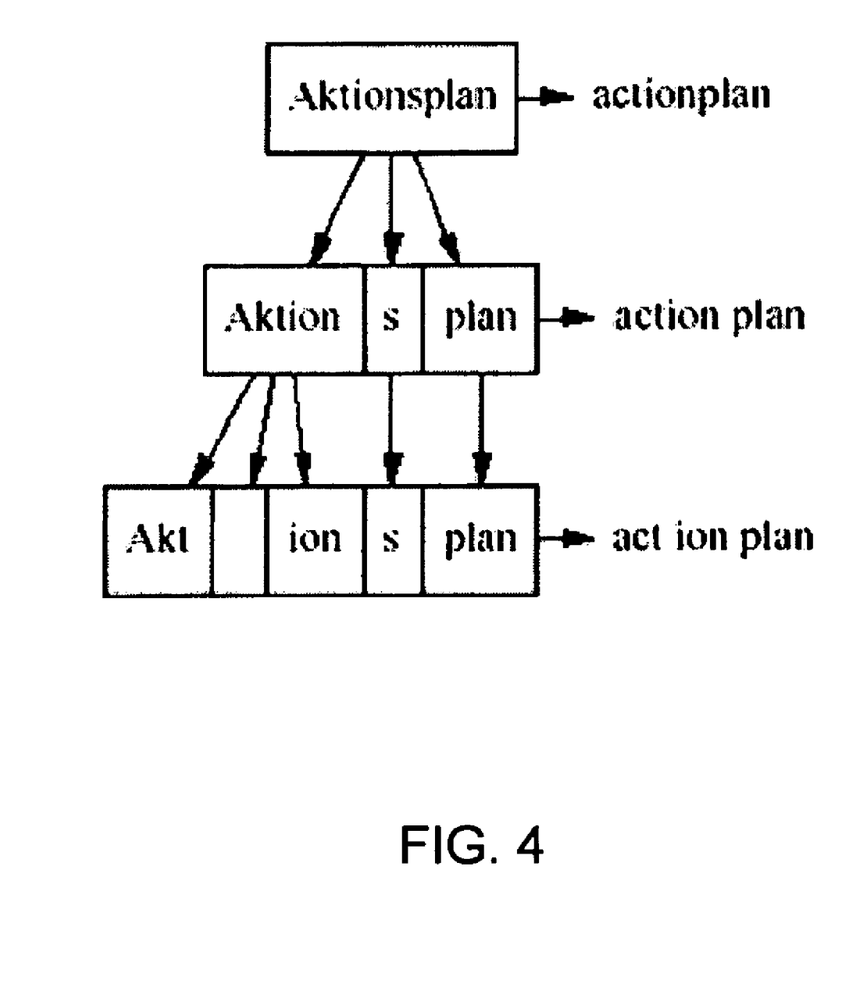
FIG. 4 shows splitting options for the compounded German word "Aktionsplan".

The split generator 205 may account for filler letters between words in the compound. For example, the letter "s" is a filler letter in "Aktionsplan", which is a compound of the words "Aktion" and "Plan". The filler letters "s" and "es" may be allowed when splitting German words, which covers most cases. The splits may be generated using an exhaustive recursive search. As shown in FIG. 4, the split generator may generate the following splits for "Aktionsplan": "aktionsplan"; "aktion-plan"; "aktions-plan"; and "akt-ion-plan". Each part of the splits (i.e., "aktionsplan", "aktions", "aktion", "akt", "ion", and "plan") exist as whole words in the training corpus.

The frequency module 210 may identify the split having a highest probability based on word frequency. Given the count of words in the corpus, the frequency module may select the split S with the highest geometric mean of word frequencies of its parts pi (n being the number of parts):

$$\arg\max S \left( \prod_{p_i \in S} \text{count}(p_i) \right)^{\frac{1}{n}}$$

The frequency module 210 utilizes a metric based on word frequency. The metric is based on the assumption that the more frequent a word occurs in a training corpus, the larger the statistical basis to estimate translation probabilities, and the more likely the correct translation probability distribution will be learned. However, since this metric is defined purely in terms of German word frequencies, there is not necessarily a relationship between the selected option and correspondence to English words. If a compound occurs more frequently in the text than its parts, this metric would leave the compound unbroken, even if it is translated in parts into English. In fact, this is the case for the example "Aktionsplan". As shown in Table 1, the mean score for the unbroken compound (852) is higher than the preferred choice (825.6).

TABLE 1

| Frequency of parts | Mean score |
|---|---|
| aktionsplan (852) | 852 |
| aktion (960), plan (710) | 825.6 |
| aktions (5), plan (710) | 59.6 |
| akt (224), ion (1), plan (710) | 54.2 |

On the other hand, a word that has a simple one-to-one correspondence to English may be broken into parts that bear little relation to its meaning. For example, the German word "Freitag" (English: "Friday") may be broken into "frei" (English: "free") and "Tag" (English: "day"), as shown in Table 2.

TABLE 2

| Frequency of parts | Mean score |
|---|---|
| frei (885), tag (1864) | 1284.4 |
| freitag (556) | 556 |

Figure 5:
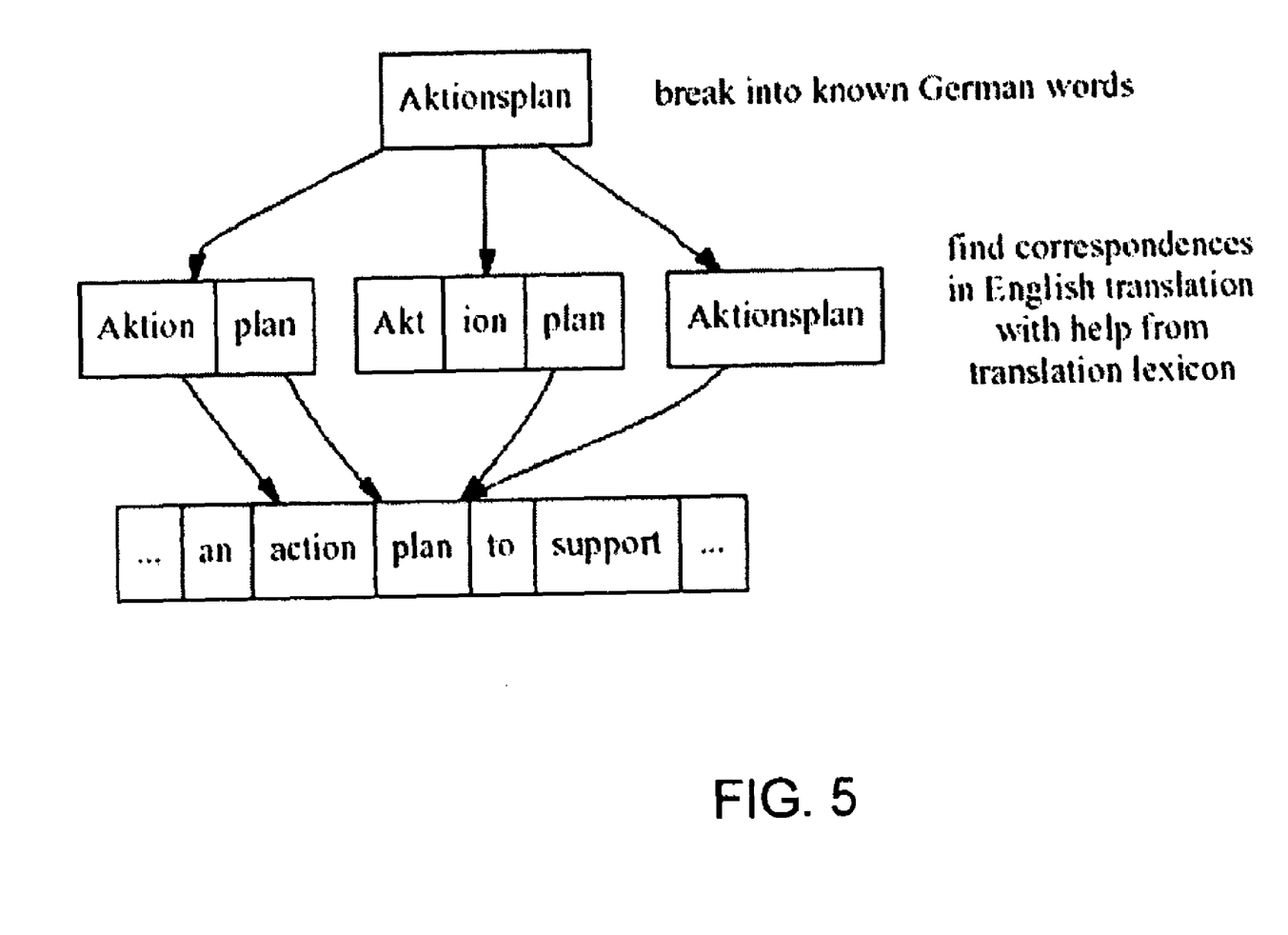
FIG. 5 shows correspondences between the splitting options for "Aktionsplan" and the English translation.

The translation lexicons may be used to improve one-to-one correspondence with English. The primary translation lexicon 215 can check for each split whether that split's parts have translations in the English translation of the foreign language sentence(s) in the parallel corpus containing the compound. In the case of "Aktionsplan", the words "action" and "plan" would be expected on the English side, as shown in FIG. 5. In case of "Freitag" the words "free" and "day" would not be expected. This information may be used by the compound splitting module 120 to break up "Aktionsplan", but not "Freitag".

The primary translation lexicon 215 may be learned from the parallel corpus 150. This can be done with the toolkit Giza, which establishes word-alignments for the sentences in the two languages. The toolkit Giza is described in Al-Onaizan et al., "Statistical machine translation," Technical report, John Hopkins University Summer Workshop (1999).

To deal with noise in the translation table, the primary translation lexicon 215 may require that the translation probability of the English word given the German word be at least 0.01. Also, each English word may be considered only once. If a word is taken as evidence for correspondence to the first part of the compound, that word is excluded as evidence for the other parts. If multiple options match the English, the one(s) with the most splits may be selected and word frequencies may be used as a tie-breaker.

While this method has been found to work well for the examples "Aktionsplan" and "Freitag", it failed in an experiment for words such as "Grundrechte" (English: "basic rights"). This word should be broken into the two parts "Grund" and "Rechte". However, "Grund" translates usually as "reason" or "foundation". But here, the more correct translation is the adjective "basic" or "fundamental". Such a translation only occurs when "Grund" is used as the first part of a compound.

The second translation lexicon 220 may be used to account for such special cases. German words in the parallel corpus 150 may be broken up with the frequency method. Then, the translation lexicon may be trained using Giza from the parallel corpus with split German and unchanged English. Since in this corpus "Grund" is often broken off from a compound, the compound splitting module learns the translation table entry "Grund"⇔"basic". By joining the two translation lexicons, the same method may be applied, but this time with the correct split of "Grundrechte".

A vast amount of splitting knowledge (for this data, 75,055 different words) is acquired by splitting all the words on the German side of the parallel corpus. This knowledge contains for instance that "Grundrechte" was split up 213 times and kept together 17 times. When making splitting decisions for new texts, the compound splitting module 120 may use the most frequent option based on the splitting knowledge. If the word has not been seen before, the compound splitting module may use the frequency method as a back-off.

The POS module 225 may be used to prevent errors involving the splitting off of prefixes and suffixes. For instance, the word "folgenden" (English: "following") may be broken off into "folgen" (English: "consequences") and den (English: "the"). This occurs because the word "the" is commonly found in English sentences, and therefore taken as evidence for the existence of a translation for "den". Another example for this is the word "Voraussetzung" (English: "condition"), which is split into "vor" and "aussetzung". The word "vor" translates to many different prepositions, which frequently occur in English.

To exclude these mistakes, the POS module 225 may only break compounds into content words, e.g., nouns, adverbs, adjectives, and verbs, and not prepositions or determiners. The German corpus may be tagged with POS tags using a tagger, e.g., the TnT tagger, which is described in Brants, T., "TnT—a statistical part-of-speech tagger," Proceedings of the Sixth Applied Natural Language Processing Conference ANLP (2000).

The POS module 225 may obtain statistics on the POS of words in the corpus and use this information to exclude words based on their POS as possible parts of compounds.

Experiments were performed using a corpus of 650,000 NP/PPs. The corpus included an English translation for each German NP/PP. The corpus was extracted from the Europarl corpus with the help of a German and English statistical parser. This limitation was made for computational reasons, since most compounds were expected to be nouns. An evaluation of full sentences is expected to show similar results.

The performance of the compound splitting module 120 was evaluated on a blind test set of 1000 NP/PPs, which contained 3498 words. To test one-to-one correspondence of split or not-split German words into parts that have a one-to-one translation correspondence to English words, the test set was manually annotated with correct splits. The splitting techniques were then evaluated against this gold standard. The results of this evaluation are given in Table 3.

TABLE 3

| | correct | | wrong | | | metrics | | |
|---|---|---|---|---|---|---|---|---|
| Method | split | not | not | faulty | split | prec. | recall | acc. |
| Raw | 0 | 3296 | 202 | 0 | 0 | — | 0.0% | 94.2% |
| Eager | 148 | 2901 | 3 | 51 | 397 | 24.8% | 73.3% | 87.1% |
| Frequency based | 175 | 3176 | 19 | 8 | 122 | 57.4% | 96.6% | 95.7% |
| Parallel | 180 | 3270 | 13 | 9 | 27 | 83.3% | 89.1% | 98.6% |
| Parallel and POS | 182 | 3287 | 18 | 2 | 10 | 93.8% | 90.1% | 99.1% |

In the columns, "correct-split" refers to words that should be split and were split correctly. "Correct-not" refers to words that should not be split and were not split. "Wrong-not" refers to words that should be split but were not split. "Wrong-faulty" refers to words that should be split, were split, but incorrectly (either too much or too little). "Wrong-split" refers towards that should not be split, but were split. "Precision" is the ratio of (correct split)/(correct split+wrong faulty split+wrong superfluous split). "Recall" is the ratio or (correct split)/(correct split+wrong faulty split+wrong not split). "Accuracy" is the ratio of (correct)/(correct+wrong).

In the rows, "raw" refers to the results with unprocessed data with no splits. "Eager" refers to the biggest split, i.e., the compound split into as many parts as possible. If multiple biggest splits are possible, the one with the highest frequency score is taken. In the "frequency based" method, the word is split into most frequent words. In the "parallel" method, the split is guided by splitting knowledge from a parallel corpus. In the combined "parallel and POS" method the split is guided by splitting knowledge from a parallel corpus with an additional restriction on the POS of split parts.

For one-to-one correspondence, the most sophisticated method that employs splitting knowledge from a parallel corpus and information about POS tags provides the best results, with 99.1% accuracy. The main remaining source of error is the lack of training data. For instance, the method failed on more obscure words such as "Passagier-aufkommen" (English: "passenger volume"), where even some of the parts have not been seen in the training corpus.

An experiment was performed to test translation quality with a word-based MT system. The translation model used was the IBM Model 4. The system was trained on the 650,000 NP/PPs with the Giza toolkit, and the translation quality was evaluated on the same 1000 NP/PP test set as in experiment described above for one-to-one correspondence. Training and testing data was split consistently in the same way. The translation accuracy is measured against reference translations using the BLEU score, described in Papineni et al., "BLEU: a method for automatic evaluation of machine translation," Proceedings of the 40th Annual Meeting of the Association for Computational Linguistics (ACL) (2002). The results are shown in Table 4.

TABLE 4

| Method | BLEU |
|---|---|
| Raw | 0.291 |
| Eager | 0.222 |
| Frequency based | 0.317 |
| Parallel | 0.294 |
| Parallel and POS | 0.306 |

In this experiment, the frequency based method produced better translation quality than the more accurate methods that take advantage of knowledge obtained from the parallel corpus. One reason for this may be that the system recovers more easily from words that are split too much than from words that are not split up sufficiently. However, this has limitations as shown by the poor results of the eager method.

Compound words violate the bias for one-to-one word correspondences of word based statistical MT systems. This is one of the motivations for phrase based systems that translate groups of words, such as that described in co-pending application Ser. No. 10/402,350, filed Mar. 27, 2003, which is incorporated herein in its entirety. The results are shown in Table 5.

The translation quality was also tested using a phrase-based MT system. This system was trained with the different flavors of the training data, and the performance was evaluated as before.

TABLE 5

| Method | BLEU |
|---|---|
| Raw | 0.305 |
| Eager | 0.344 |
| Frequency based | 0.342 |
| Parallel | 0.330 |
| Parallel and POS | 0.326 |

Here, the eager splitting method that performed poorly with the word-based statistical MT system gave the best results. The task of deciding the granularity of good splits may be deferred to the phrase-based statistical MT system, which uses a statistical method to group phrases and rejoin split words. This turns out to be even slightly better than the frequency based method.

In an embodiment, the words resulting from compound splitting could also be marked as such, and not just treated as regular words.

A number of embodiments have been described. Nevertheless, it will be understood that various modifications may be made without departing from the spirit and scope of the invention. For example, blocks in the flowchart may be skipped or performed out of order. Accordingly, other embodiments are within the scope of the following claims.

The invention claimed is:

1. A machine translation system implemented method, the method comprising:
   identifying one or more split options for a compounded word in a source language, each split option having a translation in a target language, the identifying performed by the machine translation system;
   ranking the compounded word and the one or more split options, the ranking performed by the machine translation system; and selecting a translation option from the compounded word and the one or more split options, the selecting performed by the machine translation system.

2. The method of claim 1, further comprising:
providing the translation option to a machine translation system for translation into the target language.

3. The method of claim 1, wherein said ranking comprises:
ranking the compounded word and the one or more split options based on the number of split options.

4. The method of claim 1, wherein said ranking comprises:
ranking the compounded word and the one or more split options based on the frequency of occurrence of the compounded word and the one or more split options in a source language corpus.

5. The method of claim 1, wherein said ranking comprises:
identifying a translation pair including the compounded word in a parallel corpus, said translation pair including a translation of the compounded word in the target language; and
comparing the compounded word and the one or more split options to the translation of the compounded word in the target language.

6. The method of claim 1, wherein said identifying comprises:
excluding a potential split option based on a part-of-speech of said potential split option.

7. The method of claim 6, wherein the part-of-speech comprises one of a preposition and a determiner.

8. An apparatus comprising:
a split generator to identify one or more split options for a compounded word in a source language, each split option having a translation in a target language;
a module to generate ranking information for the compounded word and the one or more split options; and
a split selector to rank the compounded word and the one or more split options based on the ranking information and select a translation option from the compounded word and the one or more split options.

9. The apparatus of claim 8, wherein the module comprises:
a frequency module to identify the frequency of occurrence of the compounded word and the one or more split options in a source language corpus.

10. The apparatus of claim 8, wherein the module comprises:
a translation lexicon to identify a translation pair including the compounded word in a parallel corpus, said translation pair including a translation of the compounded word in the target language, and compare the compounded word and the one or more split options to the translation of the compounded word in the target language.

11. The apparatus of claim 8, wherein the module comprises a translation table generated by splitting compounded words in a parallel corpus and aligning the split compounded words with corresponding target words in the parallel corpus.

12. The apparatus of claim 8, wherein the module comprises:
a module to exclude a potential split option based on a part-of-speech of said potential split option.

13. The apparatus of claim 12, wherein the part-of-speech comprises one of a preposition and a determiner.

14. An article comprising a machine-readable medium including machine-executable instructions, the instructions operative to cause a machine to:
identify one or more split options for a compounded word in a source language, each split option having a translation in a target language;
rank the compounded word and the one or more split options; and
select a translation option from the compounded word and the one or more split options.

15. The article of claim 14, further comprising instructions to cause the machine to:
provide the translation option to a machine translation system for translation into the target language.

16. The article of claim 14, wherein the instructions for ranking comprise instructions to cause the machine to:
rank the compounded word and the one or more split options based on the number of split options.

17. The article of claim 14, wherein the instructions for ranking comprise instructions to cause the machine to:
rank the compounded word and the one or more split options based on the frequency of occurrence of the compounded word and the one or more split options in a source language corpus.

18. The article of claim 14, wherein the instructions for ranking comprise instructions to cause the machine to:
identify a translation pair including the compounded word in a parallel corpus, said translation pair including a translation of the compounded word in the target language; and
compare the compounded word and the one or more split options to the translation of the compounded word in the target language.

19. The article of claim 14, wherein the instructions for identifying comprise instructions to cause the machine to:
exclude a potential split option based on a part-of-speech of said potential split option.

20. The article of claim 19, wherein the part-of-speech comprises one of a preposition and a determiner.

* * * * *